(No Model.)
E. G. SCHLEICHER.
WHEEL FOR VEHICLES.
No. 527,727.    Patented Oct. 16, 1894.
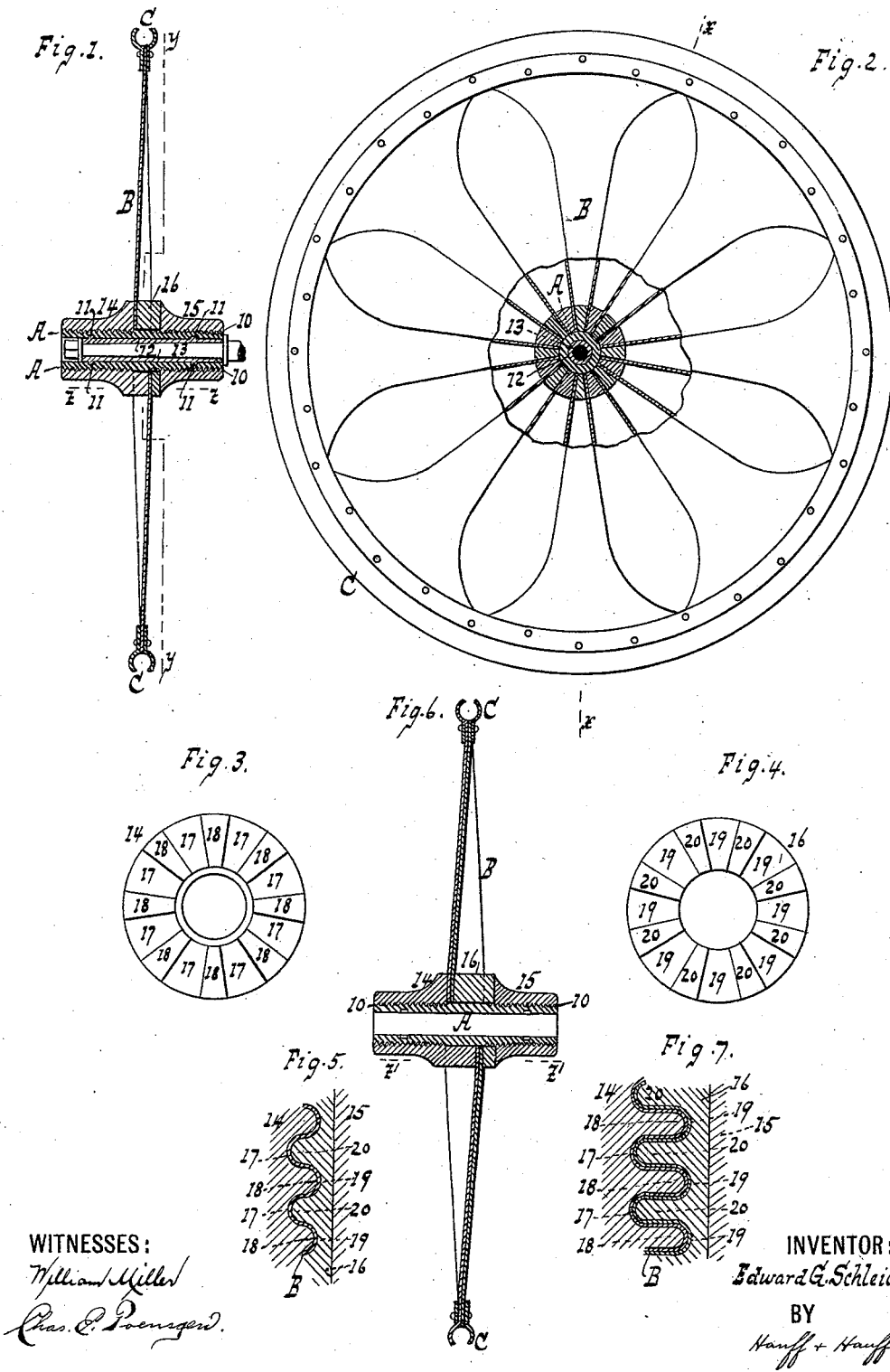
WITNESSES:
William Miller
Chas. E. Poensgen
INVENTOR:
Edward G. Schleicher
BY
Hauff + Hauff
ATTORNEYS.

UNITED STATES PATENT OFFICE.

EDWARD G. SCHLEICHER, OF STAMFORD, CONNECTICUT.

WHEEL FOR VEHICLES.

SPECIFICATION forming part of Letters Patent No. 527,727, dated October 16, 1894.

Application filed June 21, 1894. Serial No. 515,270. (No model.)

*To all whom it may concern:*

Be it known that I, EDWARD G. SCHLEICHER, a citizen of the United States, residing at Stamford, in the county of Fairfield and State of Connecticut, have invented new and useful Improvements in Wheels for Vehicles and Cycles, of which the following is a specification.

This invention relates to a wheel the hub of which is composed of a metal tube having a screw thread on its outer surface and recesses in its inner surface, two nuts adapted to engage the screw thread of the metal tube and serving to connect the hub and the web of the wheel and a lining of an antifriction metal in the interior of the metal tube, said lining being retained in position by the recesses in the inner surface of the metal tube.

The web of the wheel consists of a corrugated sheet metal disk, the corrugations of which engage corresponding corrugations on the inner surface of one of the nuts and also on the inner surface of a washer placed between the web and the second nut.

My invention is illustrated in the accompanying drawings, in which—

Figure 1 represents a transverse vertical section of a wheel the web of which consists of a single corrugated metal disk, the plane of section being indicated by the line $xx$ Fig. 2. Fig. 2 is a sectional face view, the plane of section being indicated by the line $yy$ Fig. 1. Fig. 3 is an elevation of the inside face of one of the nuts on a larger scale than the previous figures. Fig. 4 is an elevation of the inside face of the washer. Fig. 5 is a horizontal section in the plane $zz$ Fig. 1, the section being drawn on the same scale as Figs. 3 and 4. Fig. 6 is a transverse vertical section of a wheel the web of which is composed of two corrugated metal disks. Fig. 7 is a horizontal section in the plane $z'z'$ Fig. 6 on a larger scale than the previous figure.

The hub of my wheel consists of a metal tube A which is provided on its outer surface with a screw thread 10 and in its inner surface with recesses 11 which serve to retain the lining 12 which is formed of an antifriction metal, such as Babbitt metal and which can be produced by casting the antifriction metal around the axle 13. The screw threads 10 on the metal tube A engage two nuts 14, 15 and a disk or washer 16 which serve to connect the web B with the hub. This web consists of a corrugated metal disk which is provided with a central hole large enough to pass upon the tube A and the form of the corrugations as indicated in Fig. 5. The inner face of the nut 14 is provided with a series of radiating grooves 17 alternating with projections 18 (Fig. 3) and the inner face of the disk 16 (which is bored out to fit loosely upon the metal tube A) is provided with radiating grooves 19 and projections 20 (Fig. 4) and these grooves and projections are so proportioned, that when the inner portion of the corrugated metal disk B is placed against the inner face of the nut 14 and the disk 16 is forced inward by the nut 15, the corrugations of the disk are firmly clamped between the nut 14 and the disk 16 as indicated in Fig. 5 and a firm connection is effected between the web B and the hub of the wheel.

On the circumference of the web B is formed or secured a felly C of any suitable form. In the example represented by the drawings the felly is made of such a form that it is adapted to receive a pneumatic tire of the nature commonly used in bicycles.

In the example represented in Figs. 6 and 7 the web B consists of two corrugated metal disks which engage the inner faces of the nut 14 and the disk 16 in the manner shown in Fig. 7.

As indicated in Figs. 1 and 6 the corrugations of the web B increase in depth from the circumference toward the hub so as to impart to the wheel a graceful appearance.

What I claim as new, and desire to secure by Letters Patent, is—

1. A wheel comprising a metallic web B corrugated radially and provided on its periphery with a wheel rim, a metal tube provided on its outer surface with screw threads, two nuts adapted to engage the screw threads of the metal tube and a corrugated disk 16 interposed between the web B and one of said nuts, substantially as described.

2. A wheel composed of the metal tube A provided on its outer surface with screw threads, the nuts 14, 15 adapted to engage these screw threads, the nut 14 being provided on its inner surface with grooves 17 and projections 18, the disk 16 fitting loosely upon the metal tube A and provided with grooves 19 and projections 20 and the web B provided with corrugations adapted to engage the grooves and projections on the nut 14 and the disk 16 substantially as described.

In testimony whereof I have hereunto set my hand in the presence of two subscribing witnesses.

EDWARD G. SCHLEICHER.

Witnesses:
WM. C. HAUFF,
E. F. KASTENHUBER.